Patented Dec. 30, 1952

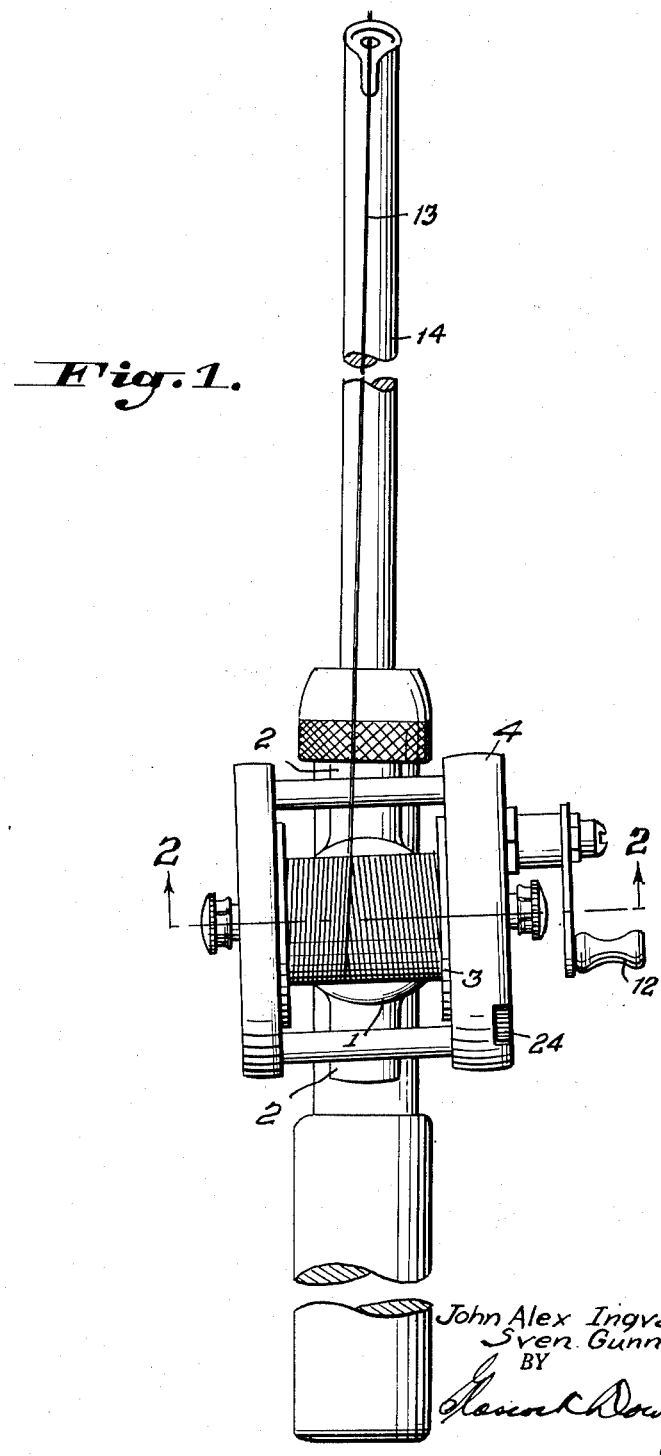

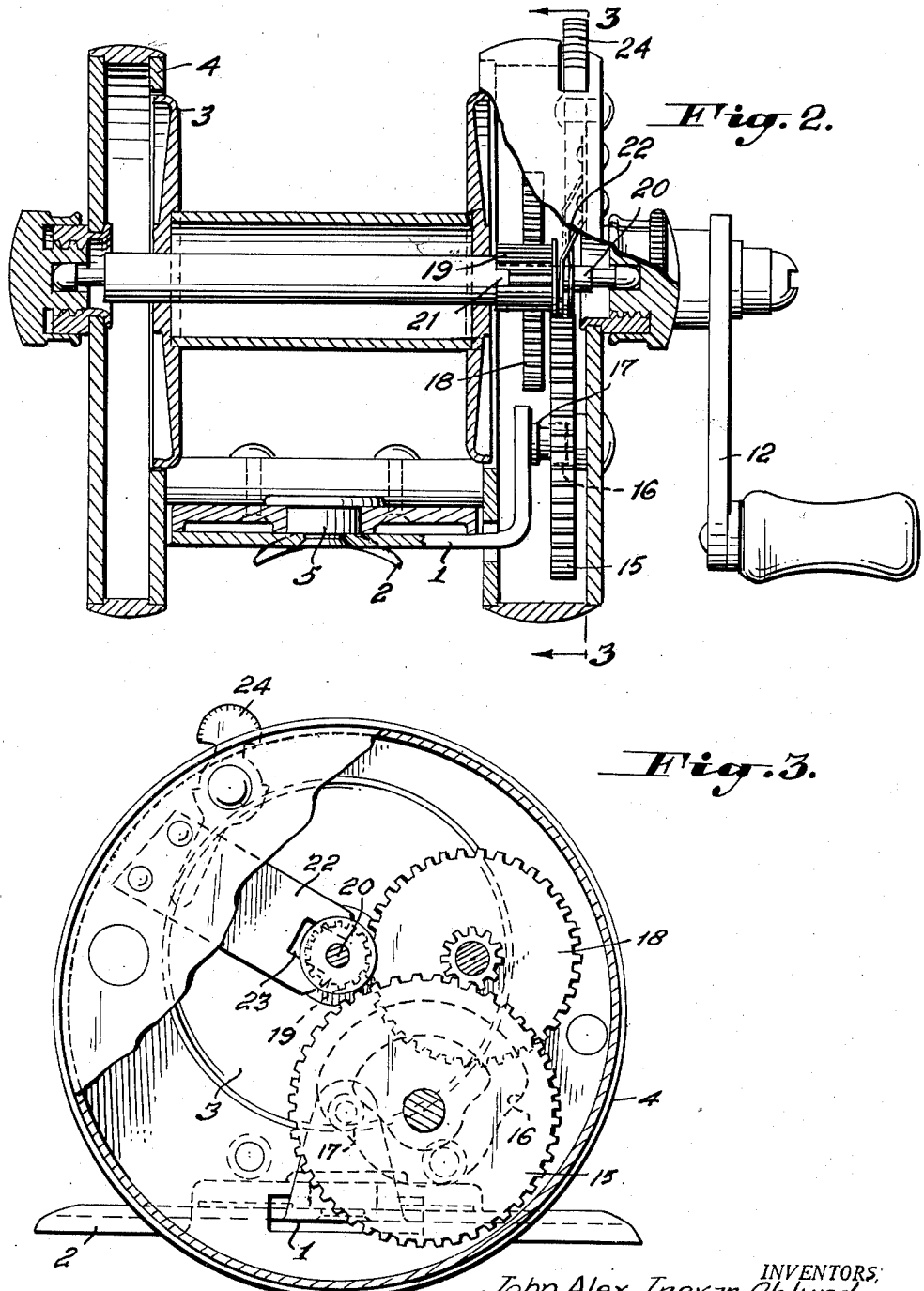

2,623,704

UNITED STATES PATENT OFFICE 2,623,704

FISHING REEL FOR FISHING RODS

Sven Gunnar Bergman and John Alex Ingvar Öhlund, Linkoping, Sweden, assignors to Aktiebolaget Rainbow, Linkoping, Sweden, a joint-stock company of Sweden Application December 27, 1948, Serial No. 67,372
In Sweden September 25, 1947

4 Claims. (Cl. 242—84.4)

In order to distribute the line uniformly along a spool of a fishing reel on a fishing rod when rewinding the line it is known to provide the reel with a so-called line guide. This guide consists of a device provided with a hole or loop for the line, which by means of a mechanism driven by the crank, is shuttled laterally along the spool. Due to the fact that the line is pulled through the above mentioned hole or loop when rewinding, the line will be uniformly distributed over the entire length of the spool. One disadvantage of this device is that when casting, the line will unwind from the spool and will drive the guide and shuttle it laterally. In case the line guide would be disconnected from the spool, the line will be forced to run at an angle to the fishing rod during the major part of unwinding through the distance between the spool and the line guide and in doing so will rub against the guide.

In both cases the resistance to unwinding will increase, which condition as a matter of fact will decrease the casting distance.

This invention relates to a fishing reel comprising a plate adapted to be fixedly secured on a fishing rod, a bracket rotatably mounted on said plate, a spool rotatably mounted on said bracket, means for manually actuating the spool, and on either said bracket or said plate an extension between two extensions on the other of these two elements for limiting the pivotal movement of said bracket to a sector of a small angle, at the center of which the axis of rotation of the spool coincides with a plane perpendicular to the longitudinal center line of the rod.

All of the foregoing and still further objects and advantages of the invention will become apparent from a study of the following specification, taken in connection with the accompanying drawings, wherein like characters of reference designate corresponding parts throughout the several views, and wherein:

Fig. 1 is a top plan view of the reel according to the invention, also showing the reel mounted on the rod;

Fig. 2 is a sectional view taken along the line 2—2 in Fig. 1; and,

Fig. 3 is another sectional view taken along the line 3—3 in Fig. 2.

The reel shown in Figures 1-3 of the drawing is provided with an attachment plate 1 for the mounting of the reel on the fishing rod, which attachment plate is provided with lugs 2 extending axially of the reel. The spool 3 of the reel is rotatably mounted in a bracket 4 which bracket in turn is rotatably mounted on the attachment plate 1 about a pivot 5 located at right angles to the axis of rotation of the spool and to the center line of the lugs 2. The latter line coincides with the longitudinal center line of the fishing rod 14 when the reel is mounted on the rod.

As shown in particular in Fig. 2, there is connected to the gear mechanism between the crank 12 and the spool 3 a gear 15 having a cam slot 16 in its side toward the attachment plate 1. On an extension of said plate there is mounted a pin 17 which travels within said slot, as is shown in Fig. 2.

By turning the crank 12 the gear 15 will be rotated. Thereby the pin 17 slides within the slot 16. Since the distance of the cam slot from the center line of the wheel 15 varies throughout its length, the bracket 4 will thereby be oscillated in a sector of a small angle, on the center line through which the axis of the spool 3 will coincide with a normal plane of the rod.

In order, that the mechanism will not increase the resistance, when unwinding the line, a release mechanism is provided for the release of the attachment plate 1 from the crank 12.

On the shaft of the crank 12 there is a gear wheel 18 meshing with a pinion gear 19 on the shaft 20 of the spool 3. This pinion 19 is slidable on the shaft 20 from the position, shown in Fig. 5, in which the pinion is through a tongue and slot coupling 21 connected to the spool, and to a released position. In said last mentioned position the spool 3 rotates independently of the crank 12 and the gear 15. A plate spring 22, one end of which is fixed to the bracket 4, engages at its other end in an annular slot 23 in the right end of the pinion 19. By swinging a lever 24, pivotally mounted on the bracket 4, the inner end of said lever forces said spring 22, together with the pinion 19 to the right, thereby releasing the spool 3 from the crank 12.

When the line 13 is to be wound on the spool, the fishing rod should be held in the left hand. While turning the crank 12 with the right hand, the bracket 4 is swung in the counterclockwise direction (Fig. 1) as the line 13 is wound upon the spool 3. In doing so the bracket 4 with the spool 3 thereon swings through a sector of a small angle, on the center line of which the axis of rotation of the spool 3 is approximately parallel to a normal plane of the fishing rod 14. When the bracket reaches the position shown in Fig. 1, in which the axis of rotation of the spool 3 is swung as far as possible in the counter-clockwise direction, that portion of the line 13, which is being wound on the spool 3, tends to move to the right. By moving the reel in the opposite direction to a position in which that portion of the line 13, which is being wound upon the spool 3, tends to move to the left in Fig. 1, the line will thereby be uniformly distributed along the spool.

Having now fully described our invention what we claim as new and useful and desire to secure by Letters Patent of the United States is:

1. A fishing reel comprising a plate adapted to be fixedly secured on a fishing rod, a bracket pivotally mounted on said plate, a spool rotatably mounted on said bracket, a manually operated crank connected to said spool for rotation of the latter, a gear rotatably mounted on the reel and drivably connected to said crank for rotation thereby and having a cam slot therein, and a pin on said plate engaged in said cam slot for oscillating the bracket as the crank is rotated.

2. A fishing reel comprising a plate adapted to be secured on a fishing rod, a bracket pivotally mounted on said plate, a spool rotatably mounted on said bracket, a manually operated crank connected to said spool for rotation of the latter, a gear rotatably mounted on the reel and drivably connected to said crank for rotation thereby, said gear having a cam slot therein comprised by two portions of different radii on the opposite sides of a diameter and concentric with respect to the axis of the gear, and two other curved portions respectively connecting the adjacent ends of the first portions, and a pin on said plate engaged in said cam slot for oscillating the bracket as the crank is rotated.

3. A fishing reel comprising a plate adapted to be fixedly secured on a fishing rod, a bracket pivotally mounted on said plate, a spool rotatably mounted on said bracket, a manually operated crank connected to said spool for rotation of the latter, a gear rotatably mounted on the reel and drivably connected to said crank for rotation thereby and having a cam slot therein, a pin on said plate engaged in said cam slot, said cam slot having such contour that the bracket is oscillated through the section of a small angle on the center line of which the axis of rotation of the rod coincides with a plane perpendicular to the longitudinal center line of the rod.

4. A fishing reel comprising a plate adapted to be fixedly secured on a fishing rod, a bracket pivotally mounted on said plate, a spool rotatably mounted on said bracket, a manually operated crank rotatably mounted on the reel, a drive intermediate said crank and the reel comprised by a gear train and a releasable clutch, a lever for releasing said clutch, a gear rotatably mounted on the reel meshing with one of the gears of said gear train and having a cam slot therein, and a pin on said plate engaged in said cam slot for oscillating the bracket as the crank is rotated.

SVEN GUNNAR BERGMAN.
JOHN ALEX INGVAR ÖHLUND.

REFERENCES CITED

The following references are of record in the file of this patent:

UNITED STATES PATENTS

| Number | Name | Date |
|---|---|---|
| 27,305 | Palmer | Feb. 28, 1860 |
| 1,552,038 | Comstock | Sept. 1, 1925 |
| 1,630,779 | Brislin | May 31, 1927 |
| 1,663,853 | Newville | Mar. 27, 1928 |
| 1,939,148 | Spenny | Dec. 12, 1933 |
| 2,332,481 | Boor | Oct. 19, 1943 |
| 2,458,298 | Polevoy | Jan. 4, 1949 |

FOREIGN PATENTS

| Number | Country | Date |
|---|---|---|
| 804,067 | France | July 27, 1936 |